Oct. 11, 1949.　　　H. J. MODREY　　　2,484,458
COMBINED LOCATING PIN AND CLAMP
Filed Sept. 21, 1944
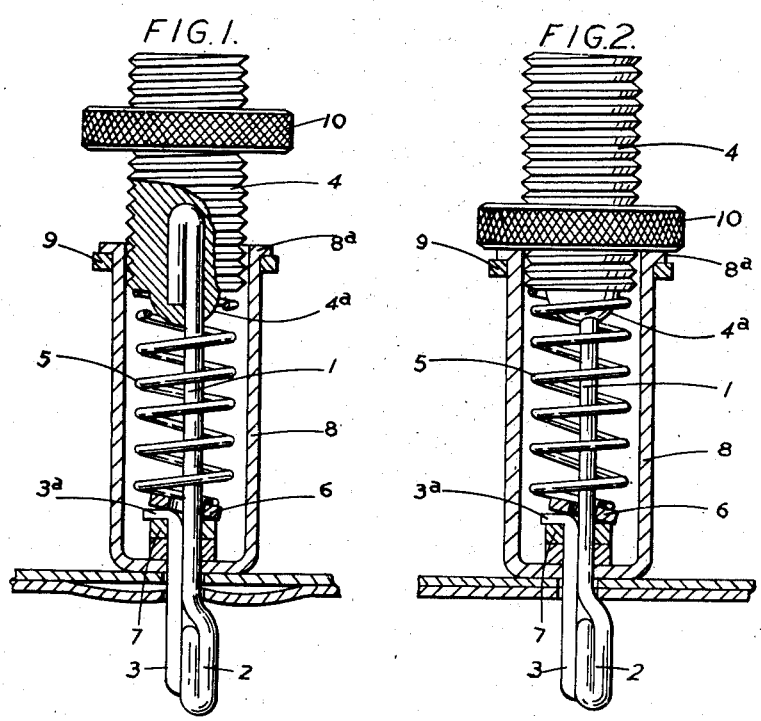
Inventor:
Henry John Modrey,
by Pierce + Scheffler,
Attorneys.

Patented Oct. 11, 1949

2,484,458

UNITED STATES PATENT OFFICE 2,484,458

COMBINED LOCATING PIN AND CLAMP

Henry John Modrey, West Orange, N. J., assignor to Modrey Patents Corporation, County of Essex, N. J., a corporation of New Jersey Application September 21, 1944, Serial No. 555,191
In Great Britain January 6, 1944

4 Claims. (Cl. 85—5)

This invention relates to locating pins of the type where a clamping rod is passed through registering holes in the plates to be located and is locked in position by spring action.

Locating devices of this general type are quite effective where the registration of the coinciding holes is accurate and where the plates are reasonably thin and flat.

In cases, however, where thick or resilient plates are involved or where the plates are buckled or distorted, the superimposed plates do not always lie flat one upon the other and the holes which are supposed to register do not always do so precisely.

The object of the present invention is to provide a locating device that meets these difficulties and which, moreover, can after insertion be positively clamped in position by screw action, if required.

Locating devices are also known which are operated by a screwing action and for purposes of differentiation from the "locating pins" before alluded to will be referred to hereinafter as "locating clamps."

In the prior art no distinction has been made between "locating pins" and "locating clamps" but it will be plain from the above that in this specification spring-operated devices are referred to as "locating pins" and screw-operated devices as "locating clamps."

In the use both of locating pins and clamps disadvantages have become apparent which it is the object of the present invention to overcome.

In locating pins the spring must be so dimensioned as to be capable (when nearly extended to its free length) of pulling firmly together the strongest sheets to be dealt with. With hand operated pins this severely limits the usefulness and with several types of pins auxiliary means such as, for instance, hand pliers have to be employed for overcoming the force of the spring. Moreover the clamping action is, of course, limited by the strength of the spring.

In locating clamps this disadvantage does not apply but they suffer from the disadvantage that they involve a two-handed operation in that, after they have been introduced into position through the holes in the plates to be located, they must be held in position until the nut has been screwed down to secure them. This latter disability is not inherent in locating pins which once inserted support themselves by reason of the spring action.

By my invention I combine the advantages of locating pins with the advantages of locating clamps and eliminate disadvantages in both by providing locating pins, as hereinbefore defined, with an additional screw clamping member, to be used optionally.

The invention therefore consists broadly of a combined locating pin and locating clamp adapted to have the clamping head of a clamping rod passed through registered holes in the plates to be located and anchored in operative position by spring action, and (if required) thereafter positively clamped in operative position by mechanical means such as a nut.

In the accompanying drawings I have illustrated an example of the invention.

Figure 1 being a sectional view of one form of the device shown in its condition as a locating pin; and Figure 2 showing the condition after the clamping nut has been operated to transform the locating pin into a locating clamp.

Referring to these drawings the numeral 1 designates a clamping rod having a clamping head 2. The body of the clamping rod is of semi-circular cross section so that when the end is bent up to form the clamping head 2 the cross section of the clamping head is circular and of a size which will pass through the holes in the plates to be located. After the clamping head 2 has been projected through the holes in the plates and displaced sideways, a wedging stud or slide member 3, which is likewise of semi-circular cross section, will follow up and lock the clamping head in its displaced position in accordance with known practice in locating pins of this type.

The other end of the clamping rod 1 is suitably secured to the piston 4. A spring 5 bearing with its upper turn against the piston acts upon a washer 6 which in turn bears upon the flange 3ª of the wedging stud 3 which is guided by the collars 7 in sliding engagement with the clamping rod 1. The casing 8, from the end of which the clamping head 2 and part of the wedging stud 3 project, is provided at its upper end with a gripping washer 9 located beneath the flange 8ª of the casing 8.

The piston 4 is screw threaded and provided with a clamping nut 10.

The manner of operating the device will be plain from an examination of Figures 1 and 2. In Figure 1 the device is shown in position after the clamping head has been passed through the holes in the plates 11 to be located, and released in normal manner in the use of locating pins. This is effected by pressure upon the end of the piston 4 so as to project the clamping head 2 beyond the tip of the wedging stud 3, and subsequently releasing piston 4. Figure 2 shows the secondary position after the clamping nut 10 has been screwed down into pressure engagement with the top of the casing 8 so that the action of the spring 5 has been superseded by the positive clamping action of the clamping head 2 and the previously bent plates flattened by the pressure exerted by this screw action.

It will be observed that the spring needs only to be sufficiently strong to hold the clamping rod in position but usually the spring will be of sufficient strength to render the device effective as a locating pin at positions where the plates are reasonably thin and flat since this will obviate the necessity of screwing up the clamping nut in all cases. In other words, on plates where a number of locating pins are to be used, some of the devices, according to the invention, can be used in normal manner as locating pins and others as locating clamps as hereinbefore defined.

Practical experience has shown that my double-action locating and clamping pins are quicker in use, in that if a plurality of closely spaced devices have to be used, in the majority of cases it will only be necessary to use the clamping action on every third or fourth pin in order to ensure complete abutment of the superimposed sheets, or to employ a smaller number of pins than would otherwise be required.

Locating pins of the type shown in Figures 1 and 2, that is, comprising a semi-circular clamping rod and wedging stud, are capable of very precise action in that both semi-circular elements precisely fill and locate in the hole in which the locating pin engages thus affording both lateral and axial location of a high degree of accuracy. Practical experience has shown that the addition of the clamping feature according to my invention, makes this type of double-action locating pin and clamp eminently suitable as a temporary precision fixing device in general toolroom work, in connection with jigs, templates and fixtures of all types, and in assembly work of all kinds.

The beforementioned fact that in certain instances the spring is merely required to support the inserted device in the operative condition, makes my double-action locating and clamping pin especially suitable for application on to larger sizes of holes and plates for which neither locating pins nor locating clamps have been found suitable. Combined devices according to my invention for use in shipbuilding, heavy or structural engineering, can be conveniently inserted by hand, become instantly self-supporting and are subsequently tightened up by means of wing nuts or wrenches applied to the clamping nut.

What is claimed, is:

1. A locking pin and clamp unit for use in coordinated holes in plates and the like which may be buckled or distorted and for clamping plates together and registering co-ordinated holes therein, comprising a casing open at one end and closed by a wall at the opposite end, said casing being adapted to bear with its closed end against the upper side of the top plate, said wall having a hole therethrough, a clamping rod disposed within the casing, said rod having on one end an enlarged clamping head extended through said hole and forming an abutment for engagement with the lower side of the bottom plate after being passed through co-ordinated holes in the plates, a threaded portion at the opposite end of the rod, a slide member mounted slidably alongside of the clamping rod and the clamping head, loaded spring means disposed within the casing between the threaded rod portion and the end wall of the casing, said spring means being arranged to bias the plates into mutual engagement and the co-ordinate holes therein into registry, said spring means also biasing the slide member through said end wall opening, whereby, upon a projection of the clamping head by a compression of the spring means and insertion of the clamping head, thus projected, into and through said plate holes, the spring-biased slide member prevents a withdrawal of the clamping head through said plate holes when the compressed spring means are released, thereby latching the plates together, and a clamping nut adjustable along the threaded portion of said rod, said nut adapted, when screwed in the direction of said plates, to engage the open end of the casing so as to apply a compressing force to the plates, thereby forcing the plates into juxtaposition in the vicinity of said plate holes and the co-ordinating plate holes into registry.

2. A locking pin and clamp unit for use in co-ordinated holes in plates and the like which may be buckled or distorted and for clamping plates together and registering co-ordinated holes therein, comprising a casing open at one end and closed by a wall at the opposite end, said casing being adapted to bear with its closed end against the upper side of the top plate, said wall having a hole therethrough, a clamping rod disposed within the casing, said rod having on one end an enlarged clamping head extended through said hole and forming an abutment for engagement with the lower side of the bottom plate after being passed through co-ordinated holes in the plates, a threaded piston-shaped member secured to the end of the rod opposite the clamping head and slidably fitted in said casing, a slidable member mounted slidably alongside of the clamping rod and the clamping head, loaded spring means disposed within the casing between the piston and the end wall of the casing, said spring means being arranged to bias the plates into mutual engagement and the co-ordinated holes into registry, whereby, upon a projection of the clamping head by a compression of the spring means in response to the application of pressure against said piston and insertion of the clamping head, thus projected, into and through the plate holes, the spring-biased slide member prevents a withdrawal of the clamping head through the plate holes when the compressed spring means are released, thereby pressing the plates together, and a clamping nut adjustable along the threaded piston, said nut being adapted, when screwed in the direction of said plates, to engage the open end of said casing as this nut is screwed toward said plates, thereby providing additional pressure to bear upon said plates in the vicinity of the plate holes.

3. The invention as set forth in claim 2, wherein the cross-section of the clamping head is substantially equal to the joint cross-section of the clamping rod and the slide member in juxtaposed position.

4. A locating pin and clamp unit for use in co-ordinated holes in plates and the like which may be buckled or distorted and for clamping the plates together and registering coordinated holes, comprising a clamping rod, said rod having an enlarged clamping head at one end constructed and positioned to form an abutment for engagement with the lower side of the bottom plate after being passed through coordinated holes in the plates, an externally threaded piston-shaped member secured to the end of the rod opposite to said head, a casing surrounding the clamping rod, said casing being open at one end and closed at the other end, the closed end of the casing having an opening therethrough for passage of said clamping head and being adapted to bear against the upper side of the top plate, spring means disposed within the casing between the piston and the closed casing end, said spring means being arranged and positioned to cooperate with said rod and to react, through the closed casing end, against the upper side of the top plate for biasing the said plates into mutual engagement and the coordinated holes into registry, and a clamping nut adjustable along said threaded piston, said nut being adapted when screwed in the direction of said plates to engage the open end of the casing so as to apply a compressing force to the plates, thereby bringing the plates into juxtaposition in the vicinity of said holes and the coordinated plate holes into registry.

HENRY JOHN MODREY.

REFERENCES CITED

The following references are of record in the file of this patent:

UNITED STATES PATENTS

| Number | Name | Date |
|---|---|---|
| 1,372,242 | Mepsted | Mar. 22, 1921 |
| 2,136,875 | Blanc | Nov. 15, 1938 |
| 2,187,929 | Blanc | Jan. 23, 1940 |
| 2,188,450 | Verdon-Roe | Jan. 30, 1940 |
| 2,230,769 | Tegerdine | Feb. 4, 1941 |
| 2,234,938 | Degener | Mar. 11, 1941 |
| 2,241,609 | McClelland et al. | May 13, 1941 |
| 2,276,498 | Lear | Mar. 17, 1942 |
| 2,318,548 | Whitehead et al. | May 4, 1943 |
| 2,327,148 | Yates | Aug. 17, 1943 |
| 2,446,030 | Tunnard-Moore | July 27, 1948 |

FOREIGN PATENTS

| Number | Country | Date |
|---|---|---|
| 443,683 | Great Britain | Mar. 4, 1936 |
| 452,358 | Great Britain | Aug. 20, 1936 |
| 498,930 | Great Britain | Jan. 17, 1939 |
| 833,695 | France | July 25, 1938 |